(12) United States Patent
Kunishige

(10) Patent No.: US 9,684,359 B2
(45) Date of Patent: Jun. 20, 2017

(54) STORAGE DEVICE AND METHOD FOR PROCESSING POWER DISABLE SIGNAL

(71) Applicant: KABUSHIKI KAISHA TOSHIBA, Tokyo (JP)

(72) Inventor: Shinji Kunishige, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 14/817,359

(22) Filed: Aug. 4, 2015

(65) Prior Publication Data

US 2016/0124487 A1    May 5, 2016

Related U.S. Application Data

(60) Provisional application No. 62/073,283, filed on Oct. 31, 2014.

(51) Int. Cl.
*G06F 1/32* (2006.01)

(52) U.S. Cl.
CPC .......... *G06F 1/3268* (2013.01); *G06F 1/3221* (2013.01); *G06F 1/3246* (2013.01)

(58) Field of Classification Search
CPC .... G06F 1/3246; G06F 1/3268; G06F 1/3221; G06F 3/0625; G06F 9/442; G06F 9/4418; G06F 2212/312
See application file for complete search history.

(56) References Cited

U.S. PATENT DOCUMENTS

| | | | |
|---|---|---|---|
| 5,535,400 A * | 7/1996 | Belmont | G06F 1/3215 713/330 |
| 2005/0251696 A1* | 11/2005 | Cumpson | G06F 1/3203 713/300 |
| 2006/0174150 A1* | 8/2006 | Nakano | G06F 1/3203 713/330 |
| 2013/0073889 A1* | 3/2013 | Rauschmayer | G06F 1/3221 713/324 |

* cited by examiner

*Primary Examiner* — Dennis M Butler
(74) *Attorney, Agent, or Firm* — Patterson & Sheridan, LLP

(57) ABSTRACT

A storage device for connection with a host device via an interface bus, includes a storage unit and a storage controller configured to control access to the storage unit and receive a power disable signal from the host device. The storage controller includes a plurality of processing units, each of which receives an interrupt signal to initiate power disable processing, in response to assertion of the power disable signal.

20 Claims, 5 Drawing Sheets

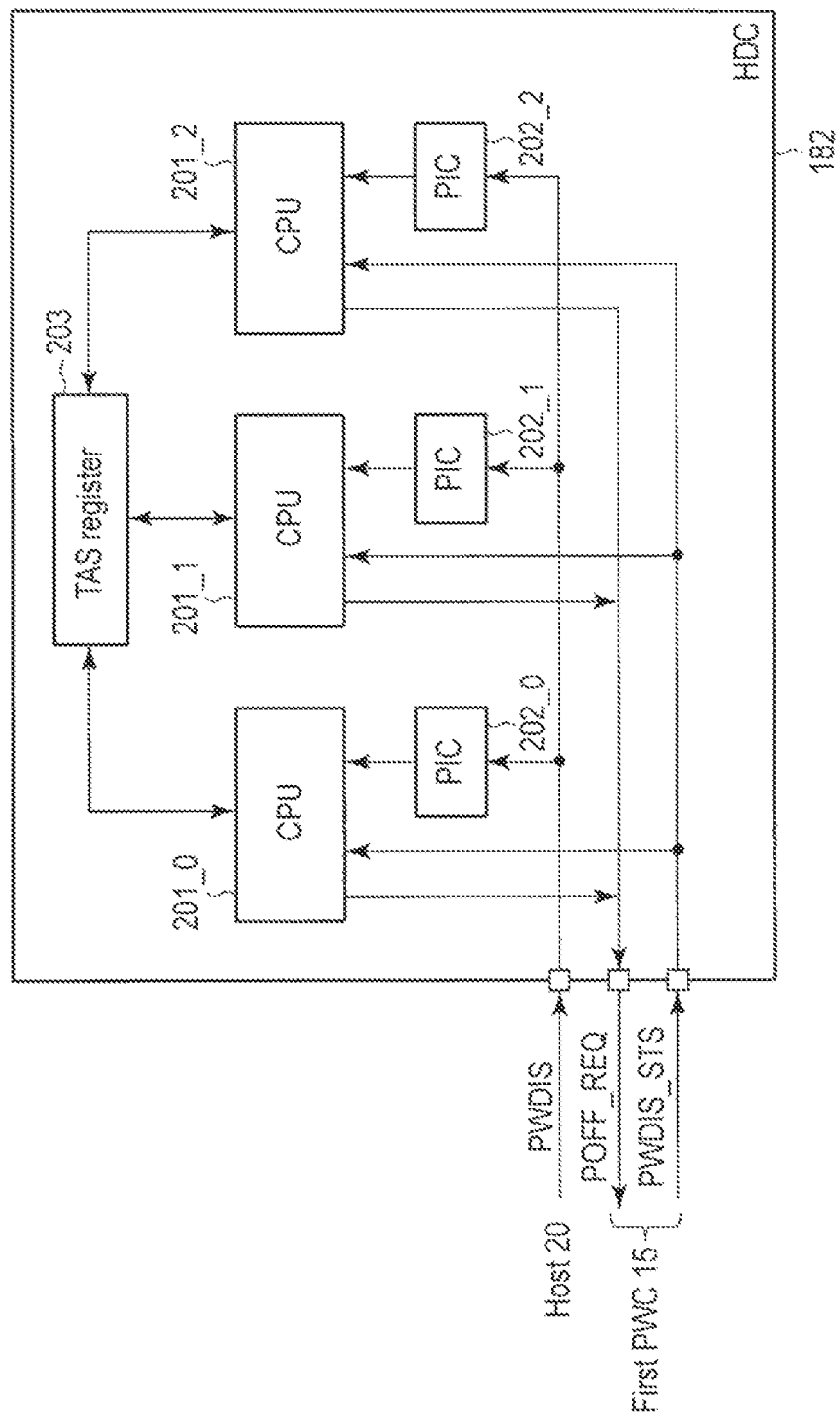
F I G. 2

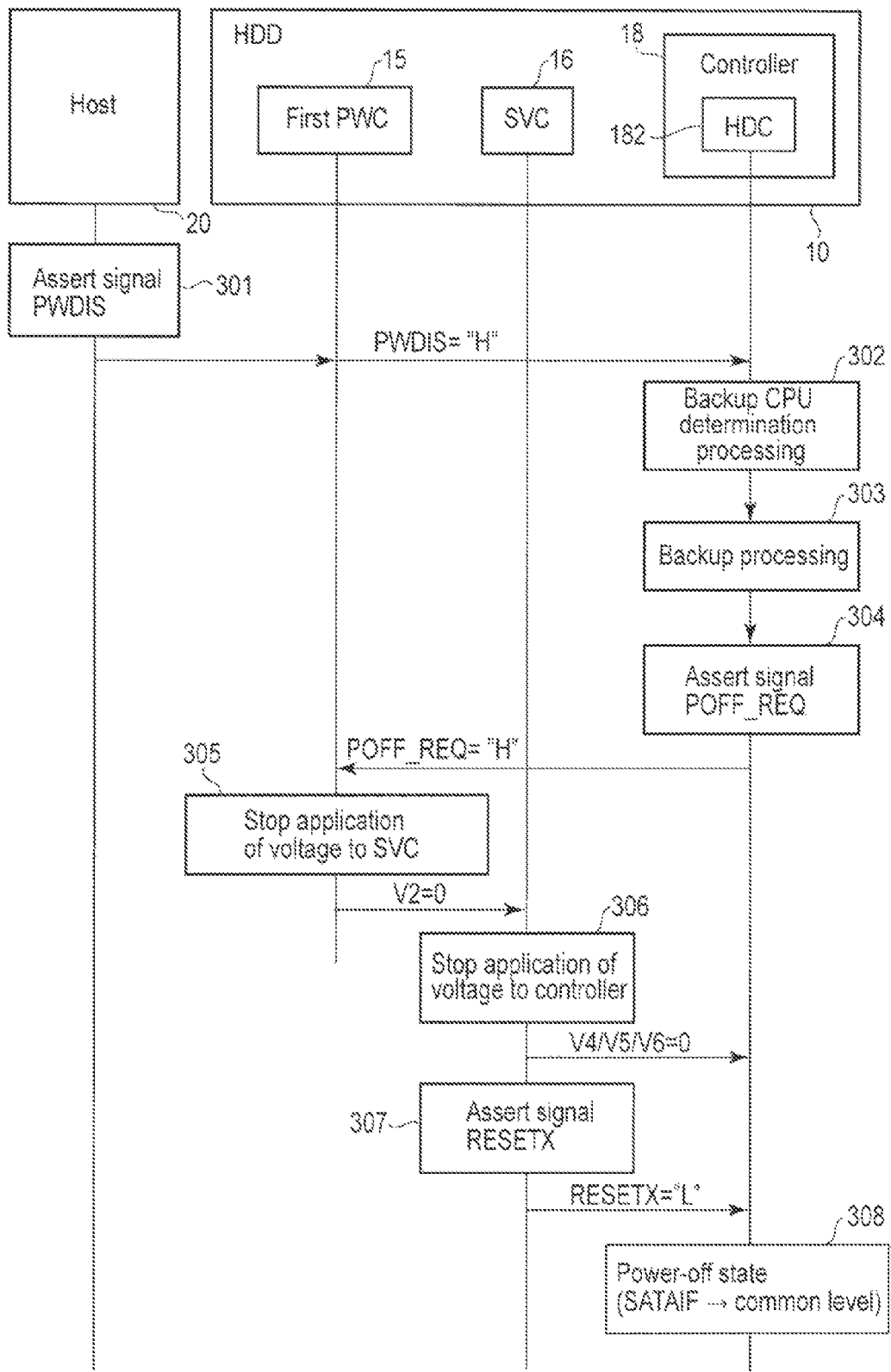
F I G. 3

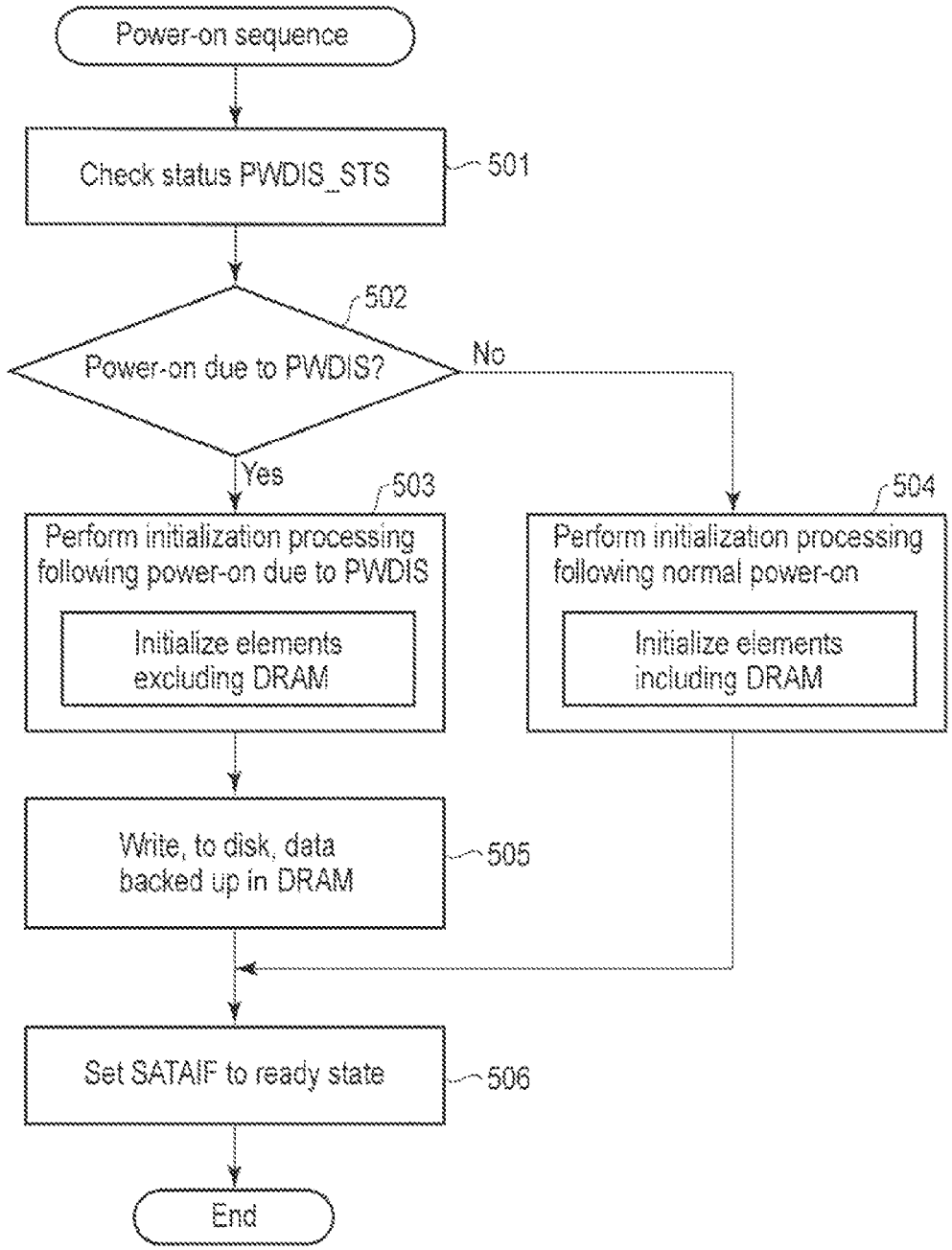
F I G. 5

STORAGE DEVICE AND METHOD FOR PROCESSING POWER DISABLE SIGNAL

This application is based upon and claims the benefit of priority from U.S. Provisional Patent Application No. 62/073,283, filed Oct. 31, 2014, the entire contents of which are incorporated herein by reference.

FIELD

Embodiments described herein relate generally to a storage device and a method for processing a power disable signal.

BACKGROUND

In general, a storage device is connected to a host device (or expander) via an interface bus (host interface bus), such as a serial attached SCSI (SAS) bus or a serial AT attachment (SATA) bus. As a standard of such an interface bus, new power disable specifications are developed. The new power disable specifications are associated with device power management functions. In accordance with the new power disable specifications, an initiator (e.g., the host device) can disable power supply to main elements of the storage device as a target, which include a storage controller.

When a hang-up occurs in the interface bus, it is possible that a storage controller in the storage device is also hung up. According to the new power disable specifications, if the initiator (host device) determines that the interface bus is hung up, the host device asserts a power disable signal PWDIS supplied to the target (i.e., the storage device). When the signal PWDIS is asserted, the storage device should execute processing appropriately even if the storage controller of the storage device is hung up.

BRIEF DESCRIPTION OF THE DRAWINGS

FIG. 2 is a block diagram showing an exemplary configuration of a hard disk controller (HDC) of the storage system shown in FIG. 1.

FIG. 3 is a sequence chart of an exemplary operation performed by the storage system according to the embodiment, from when a host device detects a hang-up of a host interface bus until when the HDC shifts to a power-off state.

FIG. 5 is a flowchart of an exemplary procedure of the power-on sequence.

DETAILED DESCRIPTION

Various embodiments will be described hereinafter with reference to the accompanying drawings.

In general, according to one embodiment, a storage device for connection with a host device via an interface bus, includes a storage unit and a storage controller configured to control access to the storage unit and receive a power disable signal from the host device. The storage controller includes a plurality of processing units, each of which receives an interrupt signal to initiate power disable processing, in response to assertion of the power disable signal.

Figure 1:
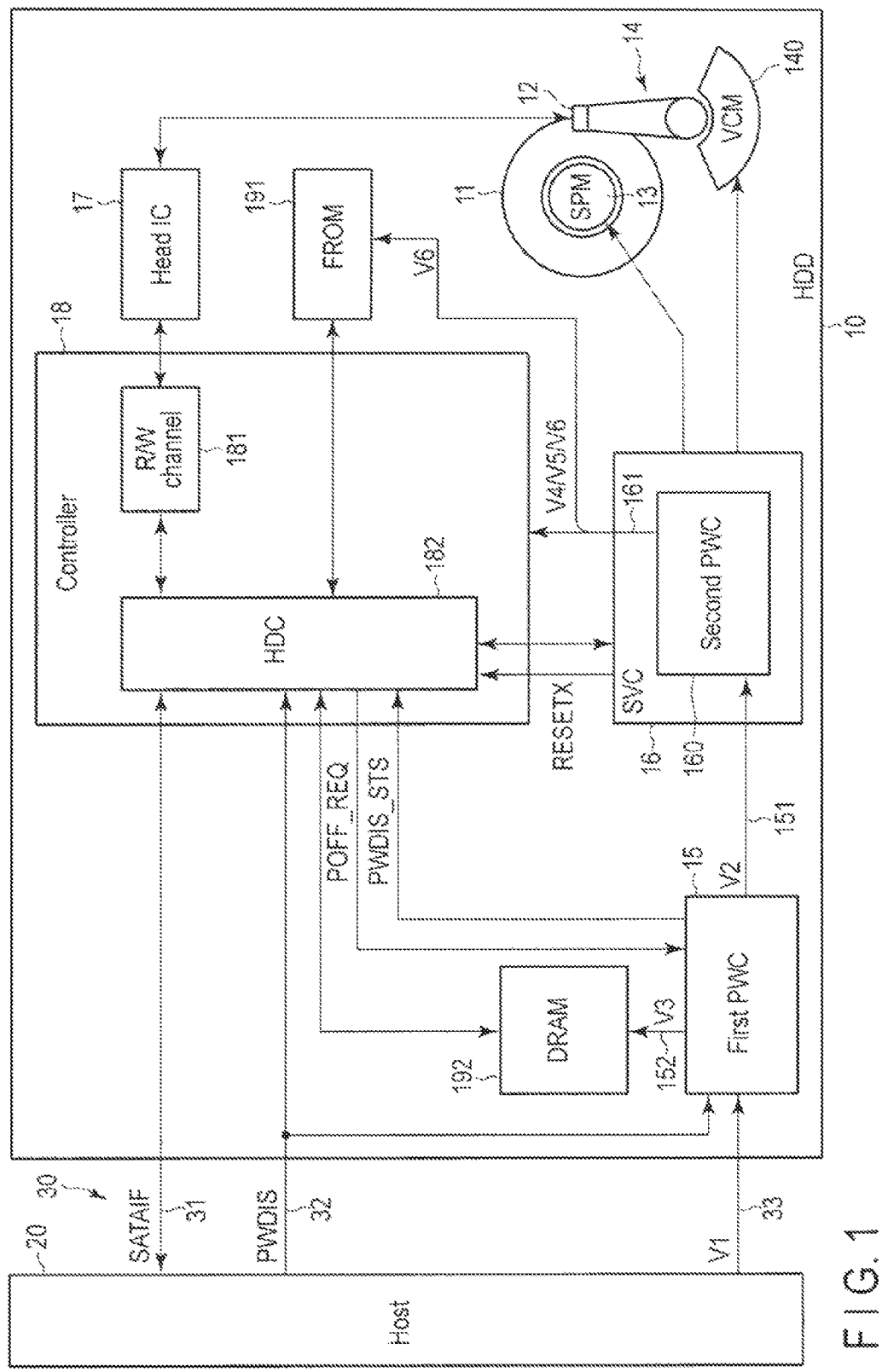
FIG. 1 is a block diagram showing an exemplary configuration of a storage system according to an embodiment.

FIG. 1 is a block diagram showing an exemplary configuration of a storage system according to an embodiment. The storage system shown in FIG. 1 is incorporated in an electronic device, such as a personal computer, a video camera, a music player, a portable terminal, a mobile phone or a printer device.

The storage system comprises a magnetic disk device 10 and a host device (hereinafter referred to as a host) 20. The magnetic disk device 10 is a storage device and also called a hard disk drive (HDD). In the description below, the magnetic disk device 10 will be referred to as the HDD 10. The HDD 10 is connected to the host 20 via a host interface bus 30. The host interface bus 30 is, for example, an SATA bus. The host 20 utilizes the HDD 10 as a storage device for the host.

The host interface bus 30 comprises a data transceiving line (hereinafter referred to as an "SATAIF line") 31, a power disable signal line (hereinafter referred to as a "PWDIS line") 32, and a power supply line 33. In the embodiment, the SATAIF line 31 comprises a pair of transmission signal lines and a pair of received signal lines. The PWDIS line 32 is used to transfer a power disable signal PWID (hereinafter referred to simply as a signal PWDIS) from the host 20 to the HDD 10. The signal PWDIS is used to disable the supply of power to the essential elements of the HDD 10 including a storage controller (hereinafter, referred to simply as a controller) 18. The power supply line 33 is used to supply power from the host 20 to the HDD 10. The voltage applied to the HDD 10 via the power supply line 33 will be referred to as V1. In the embodiment, the voltage V1 is set to 5 V. However, they may be set to another value.

The HDD 10 comprises a disk (magnetic disk) 11, a head (magnetic head) 12, a spindle motor (SPM) 13, an actuator 14, a first power supply controller (hereinafter referred to as a first PWC) 15, a motor driver IC (hereinafter referred to as a servo combo or SVC) 16, a head IC 17, the controller 18, a flash ROM (FROM) 191, and a dynamic RAM (DRAM) 192. The disk 11 is a magnetic recording medium having two surfaces, one of which, for example, is used as a recording surface for magnetically recording data. The disk 11 is spun at high speed by the SPM 13. The SPM 13 is driven by a driving current (or driving voltage) applied by the SVC 16. The disk 11 (more specifically, its recording surface) has a plurality of, for example, concentric tracks.

The head 12 is disposed in a position corresponding to the recording surface of the disk 11. The head 12 is attached to the tip of the actuator 14. When the disk 11 is spun at high speed, the head 12 floats above the disk 11. The actuator 14 has a voice coil motor (VCM) 140 as a driving source for the actuator 14. The VCM 140 is driven by a driving current (voltage) applied by the SVC 16. When the actuator 14 is driven by the VCM 140, the actuator 14 moves the head 12 over the disk 11 in a radial direction of the disk 11 so as to draw an arc.

The HDD 10 may include a plurality of disks. Further, the disk 11 shown in FIG. 1 may have recording surfaces on both sides thereof, and heads may be provided in association with the respective recording surfaces.

The first PWC 15 outputs voltages V2 and V3 using the voltage V1 applied by the host 20 via the power supply line 33. Further, the first PWC 15 stops output of the voltage V3 when a signal POFF_REQ is asserted, and resumes the output of the voltage V3 when the signal POFF_REQ is deasserted. The voltages V2 and V3 are applied to the SVC 16 (more specifically, the second PWC 160 of the SVC 16) and the DRAM 192, respectively, via power supply lines 151 and 152, respectively. In the embodiment, the voltages V2 and V3 are set to 5 V and 2.5 V, respectively. However, they may be set to other values.

The first PWC 15 further generates and holds a status PWDIS_STS (first status signal) indicative of voltage generation (i.e., power supply) based on the signal PWDIS, when the signal PWDIS is deasserted. A HDC 182 is informed of the status PWDIS_STS.

The SVC 16 drives the SPM 13 and the VCM 140 under the control of the controller 18 (more specifically, the HDC 182 in the controller 18). The SVC 16 includes the second PWC (power controller) 160. The second PWC 160 outputs voltages V4, V5, and V6 using the voltage V2 applied by the first PWC 15. The voltages V4 to V6 are applied to the controller 18 via a power supply line 161. The voltage V6 is also applied to the FROM 191. The voltage V4 is used as a core voltage for the controller 18. The voltage V5 is used as an operation voltage for an analog circuit, built in the HDC 182 of the controller 18, such as an interface controller (not shown in FIG. 1) connected to the SATAIF line 31. The interface controller is also called a physical layer controller. In FIG. 2, the interface controller is omitted. In the embodiment, the voltages V4, V5, and V6 are set to 1 V, 1.8 V, and 2.5 V, respectively. However, they may be set to other values.

The head IC 17 includes a head amplifier (not shown in FIG. 1), and amplifies a signal (i.e., a read signal) read by the head 12. The head IC 17 also includes a write driver (not shown in FIG. 1), and converts write data received from an R/W channel 181 in the controller 18 into a write current, and sends the write current to the head 12.

The controller 18 is formed of, for example, a large-scale integrated circuit (LSI) with a plurality of elements integrated on a single chip, called a system-on-a-chip (SOC). The controller 18 comprises the read/write (R/W) channel 181 and the hard disk controller (HDC) 182.

The R/W channel 181 processes signals associated with read/write. The R/W channel 181 digitizes a read signal, and decodes read data from the digitized data. Further, the R/W channel 181 extracts, from the digitized data, servo data necessary to position the head 12. The R/W channel 181 encodes write data.

The HDC 182 is connected to the host 20 via at least the SATAIF line 31 and the PWDIS line 32 included in the host interface bus 30. The HDC 182 receives commands (write and read commands, etc.) from the host 20 via the SATAIF line 31. Based on a control program, the HDC 182 controls data transfer between the host 20 and the DRAM 192 and between the DRAM 192 and the R/W channel 181. The HDC 182 further controls the SVC 16 based on the control program. In the embodiment, the control program is stored in a particular area on the disk 11, and at least part of the control program is loaded to the DRAM 192 and used when the HDD 10 is turned on. The control program may be stored in the FROM 191.

The FROM 191 is a rewritable nonvolatile memory. In the embodiment, part of the storage area of the flash ROM 19 pre-stores an initial program loader (IPL). In the power-on sequence, the IPL is activated to load at least part of the control program from the disk 11 to the DRAM 192. The power-on sequence is executed when the HDD 10 is turned on.

The DRAM 192 is a rewritable volatile memory. The DRAM 192 provides an area to which at least part of the control program is loaded. The DRAM 192 also includes an area (i.e., a buffer area) for temporarily storing data to be written to the disk 11 and data read from the disk 11. The DRAM 192 further includes an area (i.e., a backup area) used to back up a predetermined type of information when the signal PWDIS is asserted.

FIG. 2 is a block diagram showing an exemplary configuration of the HDC 182 shown in FIG. 1. The HDC 182 comprises CPUs 201_0, 201_1 and 201_2, programmable interrupt controllers (PIC) 202_0, 202_1 and 202_2, and a test-and-set (TAS) register 203.

In a normal state, the CPUs 201_0, 201_1, and 201_2 execute predetermined processing of different types in parallel in accordance with the control program. Namely, in the normal state, the CPUs 201_0, 201_1, and 201_2 carry out their respective shares of an operation (or processing) requested by the HDC 182. For instance, the CPU 201_0 serves as a host CPU for receiving a command from the host 20, interpreting the received command, and controlling data transfer between the host 20 and the DRAM 192. The CPU 201_1 serves as a servo CPU for causing the SVC 16 to control movement and positioning of the head 12. The CPU 201_2 controls data writing to the disk 11 and data reading therefrom by the R/W channel 181. However, the CPU (servo CPU) 201_1 may also control data writing to the disk 11 and data reading therefrom, and the CPU 201_2 may perform other processing.

When the signal PWDIS has been asserted, the PICS 202_0, 202_1, and 202_2 output interrupt signals to the CPUs 201_0, 201_1, and 201_2, respectively. In accordance with the interrupt signals from the PICS 202_0, 202_1, and 202_2, the CPUs 201_0, 201_1, and 201_2 execute a test-and-set command using the TAS register 203. By the execution of the test-and-set command, a CPU that should perform processing exclusively is determined from the CPUs 201_0, 201_1, and 201_2. The determined CPU performs, for example, backup processing. Although in the embodiment, the HDC 182 comprises three CPUs, it may comprise two CPUs or four or more CPUs. Namely, it is sufficient if the HDC 182 comprises a plurality of CPUs.

Figure 4:
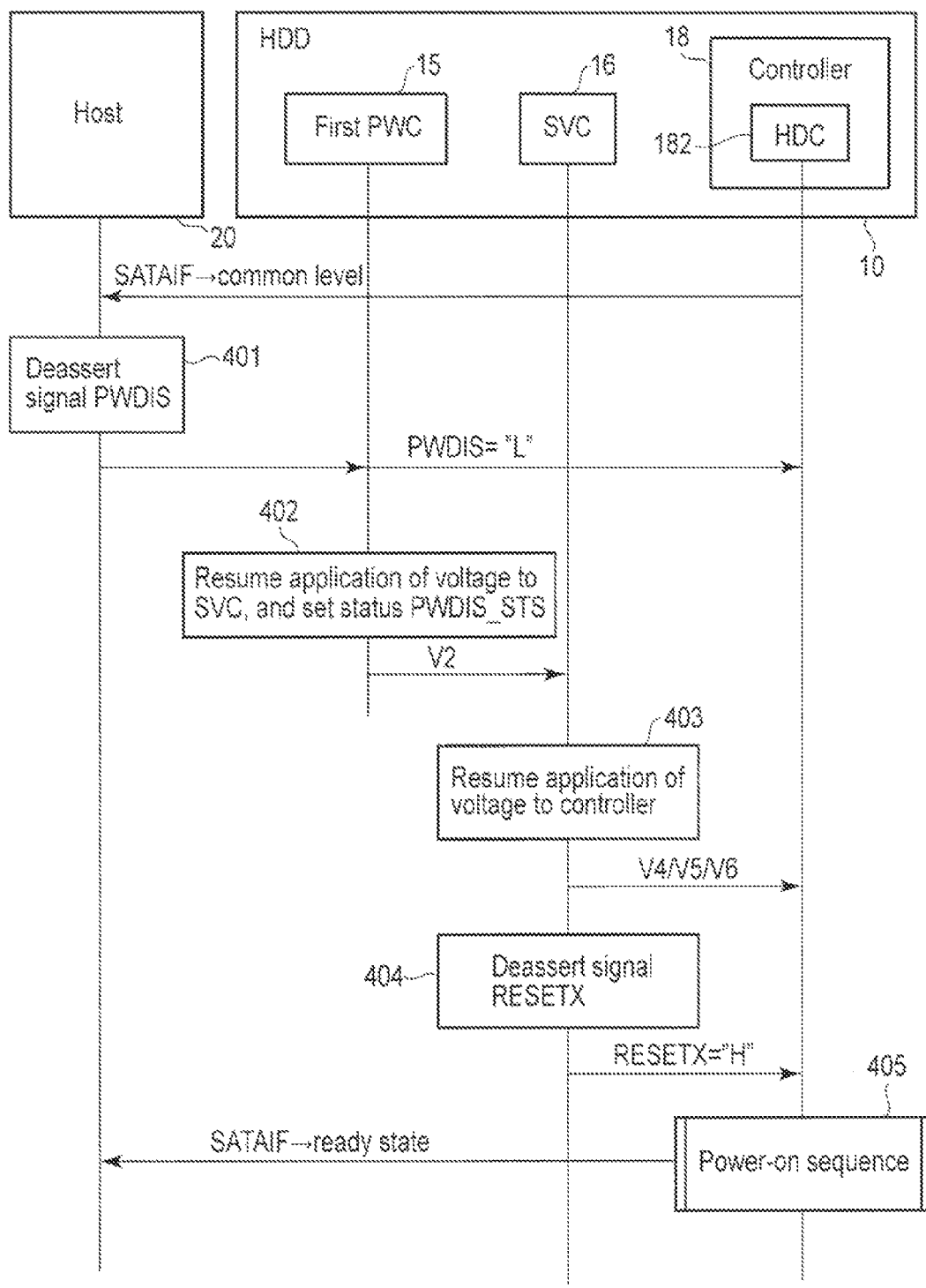
FIG. 4 is a sequence chart of an exemplary operation performed by the storage system according to the embodiment, from when the HDC shifts to the power-off state until when a power-on sequence is completed.

Referring then to FIGS. 3 to 5, operation of the HDD 10 according to the embodiment will be described. FIG. 3 is a sequence chart for explaining an exemplary operation performed by the system according to the embodiment from when the host 20 detects a hang-up of the host interface bus 30 until when the HDC 182 of the HDD 10 shifts to a power-off state. FIG. 4 is a sequence chart for explaining an exemplary operation performed by the system according to the embodiment from when the HDC 182 shifts to the power-off state until when the power-on sequence is completed. FIG. 5 is a flowchart for explaining an exemplary procedure of the power-on sequence.

It is assumed first that the host 20 has issued a command to the HDD 10 via the SATAIF line 31 of the host interface bus 30. In this case, the HDC 182 of the controller 18 of the HDD 10, in a normal state, executes the command from the host 20. Further, in a normal state, the HDC 182 returns a response indicative of completion of the command to the host 20 when the command has been executed.

However, a state wherein the HDC 182 cannot return a response indicative of the completion of the command to the host 20 may exist for some reason. If, for example, the host 20 does not receive the response indicative of the completion of the command from the HDD 10 after it waits for a predetermined period, the host 20 determines that the host interface bus 30 (more specifically, the SATAIF line 31 of the host interface bus 30) is hung up. At this time, it is possible that in the HDC 182 of the HDD 10, the host CPU in the CPUs 201_0 to 201_2, e.g., the CPU 201_0, which is configured to perform interface (communication) control between the host 20 and the HDC 182, is hung up.

If the host 20 determines that the host interface bus 30 is hung up, it asserts the signal PWDIS in the PWDIS line 32 (for example, the signal is set to high level "H") (block 301). At this time, the application of the voltage V1 to the HDD 10 by the host 20 is continued.

The signal PWDIS is transmitted to the first PWC 15 and the controller 18 in the HDD 10 via the PWDIS line 32. It should be noted that in the embodiment, the first PWC 15 does not perform any special operation when the signal PWDIS is asserted. The signal PWDIS reaching the controller 18 is transmitted to the PICS 202_0 to 202_2 in the HDC 182 of the controller 18.

The PICS 202_0 to 202_2 output interrupt signals to the CPUs 201_0 to 201_2, respectively, upon assertion of the signal PWDIS, as interrupt request signals. Upon receiving the interrupt signals from the PICS 202_0 to 202_2, the CPUs 201_0 to 201_2 jump to respective particular interrupt handlers (or interrupt processing routines) corresponding to the interrupt signals. In accordance with the interrupt handlers, the CPUs 201_0 to 201_2 execute backup CPU determination processing for determining a CPU that executes backup processing (hereinafter referred to as a backup CPU), as follows (block 302).

First, the CPU 201_i (i=0, 1, 2) executes a test-and-set command using the TAS register 203, if it is not hung up. Namely, the CPU 201_i refers to the TAS register 203, and determines whether particular data is set in the TAS register 203. The TAS register 203 is used to assign a processing right (in the embodiment, a backup processing right) to a CPU that has first set the particular data in the TAS register 203. The CPU that has acquired the backup processing right exclusively executes the backup processing.

If no particular data is set in the TAS register 203, i.e., if the TAS register is not locked, the CPU 201_i determines that the backup CPU has not been yet determined. In this case, the CPU 201_i sets particular data in the TAS register 203 in order to set itself as the backup CPU, i.e., to acquire the backup processing right. As a result, the TAS register 203 is locked.

In contrast, if the particular data has been already set in the TAS register 203, i.e., if the TAS register 203 is locked, the CPU 201_i determines that another CPU has been already determined as the backup CPU. In this case, the CPU 201_i does not acquire the backup processing right.

It is assumed, here, that the CPU 201_2 in the CPUs 201_0 to 201_2 has acquired the backup processing right in the above-described way. It is apparent that the CPU 201_2 is not hung up and has set the particular data in the TAS register 203 first. In this case, the CPU 201_2 (i.e., the backup CPU 201_2) performs the backup processing as described below (block 303). Note that any hang-up CPU cannot even access the TAS register 203.

First, the backup CPU 201_2 monitors the level of the signal PWDIS at the HDC 182 for a predetermined length of a sampling period. According to on this, the backup CPU 201_2 determines whether the signal PWDIS has actually been asserted by the host 20. Namely, the backup CPU 201_2 determines whether or not the signal PWDIS has been erroneously determined to be an asserted signal because of, for example, a noise.

If the level of the signal PWDIS is "H" during the predetermined length of the sampling period, the backup CPU 201_2 determines that the signal PWDIS has actually been asserted by the host 20. In this case, the backup CPU 201_2 writes information of a predetermined type to the backup area of the DRAM 192 (i.e., backs up the data). The information of the predetermined type includes status information held in the controller 18 and indicative of various types of statuses within the controller 18. The information of the predetermined type further includes log information, such as a time-series log, held in the controller 18 and indicative of the history of operations in the controller 18. The status information and log information are used for error analysis. Namely, the information of the predetermined type includes information used for error analysis.

After writing the information of the predetermined type in the DRAM 192 through the backup processing, the backup CPU 201_2 sets the DRAM 192 in a self-refresh mode at the end of the backup processing. The information written to the backup area of the DRAM 192 is saved therein, i.e., does not disappear, as far as the voltage V3 is applied to the DRAM 192. Similarly, data stored in the buffer area of the DRAM 192 is saved therein, i.e., does not disappear. The data stored in the buffer area of the DRAM 192 includes data (so-called dirty data) not yet written to the disk 11 when the signal PWDIS is asserted. In the embodiment, even when the host 20 asserts the signal PWDIS in order to invalidate the supply of power to the essential elements in the HDD 10 including the controller 18, the dirty data, the status information, and the log information in the HDD 10 can be saved in the DRAM 192.

Further, the CPU 201_2 executes a head unload operation if the head 12 is floating above the disk 11. Namely, the CPU 201_2 unloads (i.e., retracts) the head 12 from the disk 11 and moves to a particular place called a ramp, using the SVC 16. As a result, when the application of the voltage V2 to the SVC 16 is stopped, the head 12 is prevented from contacting the disk 11 because of the stop of the rotation of the disk 11.

After finishing the backup processing (block 303), the backup CPU 201_2 asserts the signal POFF_REQ (e.g., sets it to "H") in order to forcibly stop the application of the voltage V2 to the SVC 16 by the first PWC 15 (block 304). In block 304, the backup CPU 201_2 initializes the TAS register 203. As a result, the TAS register 203 is released from the locked state.

When the backup CPU 201_2 has asserted the signal POFF_REQ, the first PWC 15 stops the application of the voltage V2 (i.e., the supply of power of the voltage V2) to the SVC 16 although the voltage V1 continues to be applied to the first PWC 15 by the host 20 (block 305). It should be noted that the first PWC 15 does not stop the application of the voltage V3 to the DRAM 192. Thus, the first PWC 15 continues application of the voltage V3 to the DRAM 192 (i.e., the supply of power of the voltage V3).

When the first PWC 15 has stopped the application of the voltage V2 to the SVC 16, the second PWC 160 of the SVC 16 stops the application of the voltages V4 to V6 to the controller 18 and the application of the voltage V6 to the FROM 191 (block 306). This is equivalent to the stop of the application of the voltages V4 to V6 to the controller 18 and the stop of the application of the voltage V6 to the FROM 191 by the first PWC 15. In contrast, the application of the voltage V3 to the DRAM 192 is continued as mentioned above.

In order to inform the controller 18 of the stop of the application of the voltages V4 to V6 to the controller 18, the SVC 16 asserts a signal RESETX (e.g., set the signal to low level "L") (block 307). This signal PRESETX is transmitted to the HDC 182. Block 306 may be executed immediately after block 307. The "L" state of the signal RESETX is continued at least during the stop of the application of the voltage V2 to the SVC 16.

When the second PWC 160 stops the application of the voltages V4 to V6 to the controller 18, the controller 18 shifts to the power-off state (block 308). At this time, the SATAIF line 31 is set to a common level.

If the SATAIF line 31 shifts to the common level after the signal PWDIS is asserted, the host 20 determines that the host interface bus 30 may be recovered from the hang-up state. Further, the CPU 201_0 that caused the assertion of the signal PWDIS may be recovered from the hang-up state. In view of this, the host 20 de-asserts the signal PWDIS (e.g., set it to "L") in order to resume the supply of power to the SVC 16 (block 401).

When the signal PWDIS is deasserted, the first PWC 15 resumes the application of the voltage V2 to the SVC 16 (block 402). In block 402, the first PWC 15 sets a valid status PWDIS_STS. The valid status PWDIS_STS is indicative of the fact that the application of the voltage V2 to the SVC 16 (i.e., the supply of power) is resumed in accordance with de-assertion of the once-asserted signal PWDIS. The CPUs 201_0 to 201_2 in the HDC 182 of the controller 18 are informed of the status PWDIS_STS.

When the application of the voltage V2 to the SVC 16 is resumed, the second PWC 160 of the SVC 16 resumes the application of the voltages V4 to V6 to the controller 18 and the application of the voltage V6 to the FROM 191 (block 403). At this time, the SVC 16 de-asserts the signal RESETX (e.g., sets it to "H") in accordance with the resumption of application of the voltage V2 (block 404). In accordance with the de-assertion of the signal RESETX, the controller 18 is reset. Namely, in accordance with the start of the application of the voltage V2 (i.e., the supply of power), the controller 18 is reset to the power-on state.

As described above, when the voltage V1 is applied to the HDD 10 by the host 20, power-on reset is carried out if the once-asserted signal PWDIS is deasserted. The power-on reset is also carried out in a normal power-on operation during which the application of the voltage V1 to the HDD 10 is started by the host 20.

When the controller 18 is subjected to power-on reset, a predetermined CPU in the HDC 182 of the controller 18, e.g., the CPU 201_0, serves as the host CPU and executes a power-on sequence in accordance with the procedure shown in the flowchart of FIG. 5 (block 405). In the power-on sequence, the CPU 201_0 controls an interface controller and thus sets the SATAIF line 31 in a ready state.

Referring then to the flowchart of FIG. 5, the power-on sequence will be described. First, the CPU 201_0 checks the status PWDIS_STS informed by the first PWC 15 (block 501). Subsequently, the CPU 201_0 determines whether or not the power-on (power-on reset) this time is caused by de-assertion of the signal PWDIS, based on validity of the status PWDIS_STS (block 502). As described above, the valid status PWDIS_STS is set by the first PWC 15 when a once-asserted signal PWDIS is deasserted.

If the status PWDIS_STS is valid in the power-on reset state, the CPU 201_0 determines that the power-on reset state in this time is caused by the de-assertion of the once-asserted signal PWDIS (Yes in block 502). In this case, the CPU 201_0 executes HDD initialization processing following the power-on caused by the de-assertion of the signal PWDIS (block 503). By HDD initialization processing, the elements in the HDD 10 are initialized. The elements include registers in the R/W channel 181. However, the DRAM 192 is excluded from the initialization targets in block 503. As a result, in backup processing (block 303 in FIG. 3), the information backed up in the backup area of the DRAM 192 can be prevented from being lost. Data (i.e., data including dirty data) stored in the buffer area of the DRAM 192 can also be prevented from being lost.

In contrast, if the status PWDIS_STS is invalid in the power-on reset state, the CPU 201_0 determines that the power-on reset state in this time is caused by a normal power-on in which the application of the voltage V1 to the HDD 10 by the host 20 is started (No in block 502). In this case, the CPU 201_0 executes HDD initialization processing following the normal power-on (block 504). Through the HDD initialization processing in block 504, the elements of the HDD 10 including the DRAM 192 are initialized.

After executing block 503, the CPU 201_0 writes information that is backed up in the backup area of the DRAM 192 in the disk 11 via the R/W channel 181 and the head IC 17 (block 505). In block 505, the CPU 201_0 also writes, to the disk 11, dirty data stored in the buffer area of the DRAM 192. In other words, in the embodiment, even if the signal PWDIS is asserted, the application of the voltage V3 to the DRAM 192 is continued, whereby the dirty data is prevented from being lost. Thus, in a power-on sequence executed when the signal PWDIS is deasserted, non-updated data in the disk 11 can be updated with the dirty data. Further, since the loss of the dirty data can be prevented, the host 20 can resume access to the HDD 10 without checking whether any dirty data is lost.

The backup information written to the disk 11 includes the status information indicative of various statuses in the controller 18 and time-series log information indicative of the history of the operations in the controller 18 at the time when the signal PWDIS is asserted. Accordingly, based on the backup information written to the disk 11, the cause of the hand-up of the SATAIF line 31 can be analyzed.

After executing block 505, the CPU 201_0 proceeds to block 506. In contrast, after executing block 504, the CPU 201_0 skips block 505 and proceeds to block 506. In block 506, the CPU 201_0 sets the SATAIF line 31 in a ready state by controlling the interface controller. The ready state of the SATAIF line 31 is indicative of a state in which the HDD 10 (more specifically, the HDC 182 of the HDD 10) is communicable with the host 20. Thus, if the SATAIF line 31 is set in the ready state via block 503, it indicates that the SATAIF line 31 is released from the hang-up state.

In the above-described embodiment, the second PWC 160 is provided in the SVC 16. However, it may be provided outside the SVC 16. It is apparent that the combination of the first and second PWCs 15 and 160 provides a logically single PWC. Further, the HDD 10 may include a single PWC having functions equivalent to those of the first and second PWCs 15 and 160, instead of the first and second PWCs 15 and 160. In this case, the single PWC may generate the voltages V4 to V6 from the voltage V1 applied via the power supply line 33 of the host interface bus 30.

In the embodiment, a SATA bus is used as the host interface bus 30. However, such an interface bus as a SATA express bus, a SAS bus, a SAS express bus, or a peripheral component interconnect (PCI) express bus may be used as the host interface bus 30. It is sufficient that the interface bus enables a power disable signal to be transmitted.

Further, in the embodiment, an HDD (magnetic disk device) is used as a storage device. However, a storage device, such as a solid state device (SSD), other than the HDD, may be used instead of the HDD. The SSD is known as a storage device having a recording medium (nonvolatile storage medium) formed of a set of NAND flash memories.

According to at least one embodiment described above, processing can be executed appropriately in a storage device even if a storage controller in the storage device is hung up when a power disable signal is asserted.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A storage device for connection with a host device, comprising:
   a storage device;
   a volatile memory; and
   a storage controller configured to control access to the storage device and connected to a bus through which a power disable signal is received from the host device, wherein
   the storage controller includes a plurality of processors, each of which receives an interrupt signal to initiate power disable processing, in response to assertion of the power disable signal, and
   one of the processors initiates the power disable processing after reception of the interrupt signal, the power disable processing including backup of data stored in the storage controller into the volatile memory.

2. The storage device according to claim 1, wherein
   the storage controller further includes a register,
   one or more of the processors access the register, in response to reception of the interrupt signal, and
   one of the processors that accesses the register first while a predetermined flag is set in the register initiates the power disable processing.

3. The storage device according to claim 1, further comprising:
   a plurality of interrupt controllers, each configured to output the interrupt signal to one of the processors corresponding thereto, in response to the assertion of the power disable signal.

4. The storage device according to claim 1, further comprising:
   a power supply controller configured to supply power to the volatile memory while the power disable signal is asserted.

5. The storage device according to claim 4, wherein
   the power supply controller is further configured to supply power to the storage controller,
   the one of the processors outputs a signal requesting the power supply controller to stop power supply to the storage controller after the backup of the data is completed, and
   the power supply controller stops the power supply to the storage controller in response to receiving the signal.

6. The storage device according to claim 5, wherein
   the power supply controller is further configured to resume power supply to the storage controller after the power disable signal is deasserted, and
   the storage controller causes the storage device to be initialized after the power supply to the storage controller is resumed.

7. The storage device according to claim 6, wherein
   the power supply controller is further configured to transmit a valid state signal to the storage controller after the power supply to the storage controller is resumed, and
   the storage controller does not cause the volatile memory to be initialized when the valid state signal is received.

8. The storage device according to claim 1, wherein the volatile memory includes a buffer area for temporarily storing data to be written to the storage device and data read from the storage device.

9. The storage device according to claim 1, wherein the data stored in the storage controller includes status information indicating a status of the storage controller and log information indicating an operation history of the storage controller.

10. The storage device according to claim 1, wherein the storage device is a magnetic disk.

11. The storage device according to claim 1, wherein the storage device is a nonvolatile semiconductor memory.

12. A storage device for connection with a host device, comprising:
    a first storage;
    a second storage that is volatile; and
    a storage controller configured to control access to the first storage and connected to a bus through which a power disable signal is received from the host device, wherein
    the storage controller includes a plurality of processors, each of which receives an interrupt signal to initiate power disable processing, in response to assertion of the power disable signal, and
    one of the processors initiates the power disable processing after reception of the interrupt signal, the power disable processing including backup of data stored in the storage controller into the second storage.

13. An operating method of a storage device having a storage device, a volatile memory, and a storage controller including a plurality of processors, the method comprising:
    receiving, at the storage controller, a power disable signal from a host device;
    receiving, at each of the processors, an interrupt signal to initiate power disable processing, in response to assertion of the power disable signal; and
    initiating, at one of the processors, the power disable processing, after the assertion of the power disable signal, the power disable processing including backup of data stored in the storage controller into the volatile memory.

14. The method according to claim 13, wherein the storage controller further includes a register, the method further comprising:
    accessing the register from one or more of the processors, in response to reception of the interrupt signal, wherein
    the power disable processing is initiated by one of the processors that accesses the register first while a predetermined flag is set in the register.

15. The method according to claim 13, further comprising:
    supplying power to the volatile memory while the power disable signal is asserted.

16. The method according to claim 15, further comprising:
    outputting, from the one of the processors, a signal requesting a power supply controller to stop power supply to the storage controller after the backup of the data is completed; and
    stopping power supply to the storage controller in response to receiving the signal.

17. The method according to claim 16, further comprising:

resuming power supply to the storage controller after the power disable signal is deasserted; and initializing the storage device after the power supply to the storage controller is resumed.

18. The method according to claim 17, further comprising:

transmitting a valid state signal to the storage controller after the power supply to the storage controller is resumed, wherein the volatile memory is not initialized when the valid state signal is received.

19. The method according to claim 13, further comprising:

temporarily storing data to be written to the storage device and data read from the storage device in a buffer area of the volatile memory.

20. The method according to claim 13, wherein the data stored in the storage controller includes status information indicating a status of the storage controller and log information indicating an operation history of the storage controller.

* * * * *